(12) United States Patent
MacGregor

(10) Patent No.: US 7,964,817 B2
(45) Date of Patent: Jun. 21, 2011

(54) ELECTRICAL DISCHARGE MACHINE APPARATUS FOR REVERSE TAPER BORES

(75) Inventor: John MacGregor, Ann Arbor, MI (US)

(73) Assignee: AA EDM Corporation, Ann Arbor, MI (US)

( * ) Notice: Subject to any disclaimer, the term of this patent is extended or adjusted under 35 U.S.C. 154(b) by 470 days.

(21) Appl. No.: 11/750,011

(22) Filed: May 17, 2007

(65) Prior Publication Data

US 2008/0283504 A1 Nov. 20, 2008

(51) Int. Cl.
 *B23H 9/14* (2006.01)
 *B23H 7/26* (2006.01)
(52) U.S. Cl. .................... 219/69.17; 219/69.2
(58) Field of Classification Search ............... 219/69.12, 219/69.15, 69.17, 69.2; 205/665; 204/224 M, 204/225
See application file for complete search history.

(56) References Cited

U.S. PATENT DOCUMENTS

| | | | | |
|---|---|---|---|---|
| 2,902,584 | A * | 9/1959 | Ullmann | 219/69.2 |
| 3,388,232 | A | 6/1968 | Dreisin | |
| 3,539,754 | A | 11/1970 | Furze et al. | |
| 3,727,023 | A | 4/1973 | Monnich | |
| 3,783,225 | A * | 1/1974 | Filsinger | 219/69.2 |
| 3,830,996 | A * | 8/1974 | Ullmann et al. | 219/69.12 |
| 4,044,216 | A * | 8/1977 | Check et al. | 219/69.15 |
| 4,230,926 | A | 10/1980 | Gaumond | |
| 4,247,749 | A * | 1/1981 | Wavre | 219/69.2 |
| 4,455,469 | A * | 6/1984 | Inoue | 219/69.17 |
| 4,654,498 | A * | 3/1987 | Sato | 219/69.15 |
| 4,769,118 | A * | 9/1988 | Johns | 205/665 |
| 4,852,232 | A * | 8/1989 | Wells | 219/69.12 |
| 4,916,282 | A | 4/1990 | Framatome | |
| 5,029,759 | A * | 7/1991 | Weber | 219/69.17 |
| 5,159,167 | A * | 10/1992 | Chaikin et al. | 219/69.2 |
| 5,207,385 | A * | 5/1993 | Turner | 239/533.3 |
| 5,614,108 | A * | 3/1997 | Habel et al. | 219/69.15 |
| 5,951,883 | A | 9/1999 | Barbulescu | |
| 6,211,480 | B1 * | 4/2001 | Nagata | 219/69.17 |
| 6,644,565 | B2 * | 11/2003 | Hockenberger | 239/533.2 |
| 6,734,384 | B2 | 5/2004 | Barbulescu | |
| 7,019,247 | B1 * | 3/2006 | MacGregor | 219/69.2 |

(Continued)

FOREIGN PATENT DOCUMENTS

JP 55-58923 A * 5/1980

(Continued)

OTHER PUBLICATIONS machine translation of Japan Patent document No. 2003-117,734, Sep. 2009.*

(Continued)

*Primary Examiner* — Geoffrey S Evans
(74) *Attorney, Agent, or Firm* — Brinks Hofer Gilson & Lione

(57) ABSTRACT

An electrical discharge machining apparatus having a wire electrode and a guide system for machining reverse-taper bores in a workpiece, particularly cone-shaped bores. A guide body near the workpiece stabilizes a first portion of an electrode and a second portion of the electrode extends from the guide body terminating in a working tip. As the guide body is wobbled about the longitudinal axis of a desired workpiece bore, the electrode is advanced and the working tip of the electrode erodes progressively larger closed curves in the workpiece, resulting in a reverse taper bore in the workpiece.

19 Claims, 7 Drawing Sheets

U.S. PATENT DOCUMENTS

| | | |
|---|---|---|
| 7,572,997 B2 * | 8/2009 | Kao et al. .................... 219/69.17 |
| 2002/0190031 A1 | 12/2002 | Hall |
| 2003/0038117 A1 | 2/2003 | Pickel et al. |
| 2004/0056004 A1 * | 3/2004 | Aurich et al. .............. 219/69.15 |
| 2005/0061682 A1 * | 3/2005 | Lukic ........................ 204/224 M |
| 2005/0189443 A1 | 9/2005 | Taylor et al. |

FOREIGN PATENT DOCUMENTS

| | | | |
|---|---|---|---|
| JP | 1-11728 | | 1/1989 |
| JP | 1-164526 A | * | 6/1989 |
| JP | 5-277839 | | 10/1993 |
| JP | 2001-38531 | | 2/2001 |
| JP | 2003-117734 A | * | 9/2009 |
| SU | 430980 A | * | 11/1974 |

OTHER PUBLICATIONS

PCT International Search Report—PCT/US2008/060789—Aug. 7, 2008.

* cited by examiner

ELECTRICAL DISCHARGE MACHINE APPARATUS FOR REVERSE TAPER BORES

BACKGROUND OF THE INVENTION

This invention is related to an electrical discharge machine (EDM) apparatus and method for providing a reverse taper bore in a stationary workpiece by wobbling an electrode holder while an electrode acts upon the workpiece.

EDM is a well-known and widely used machining technique. It operates through electrical discharges from an electrode. The process takes place in the presence of a liquid dielectric fluid such as de-ionized water. An electrode in the shape of an elongated rod, thin wire, or shaped article is put into close contact with the workpiece. Through an electrical potential difference, arcing occurs between the workpiece and the electrode which causes erosion of the workpiece material in a desired manner. EDM processes are used in numerous machining applications and are especially desirable for applications involving high accuracy, extremely hard workpieces, low applied loading of the workpiece, or deep bores in a workpiece.

Some machining projects pose difficulties for existing EDM technology. One example relates to fuel injection nozzles of the type used in certain internal combustion engines, such as diesel engines. In a typical diesel fuel injection tip, multiple fuel injection holes are bored near the end and around the circumference of the fuel injection tip to atomize highly pressurized fuel as it is introduced into a combustion chamber. The bores are conventionally formed as cylindrical bores of generally constant diameter. It is thought, however, that bores having other shapes may be better suited to some applications. In particular, it is believed that a reverse-taper of the fuel injection tip holes, where the interior orifice of the fuel injection bores (inside the fuel injector tip) have a larger diameter than the orifice diameter at the exterior of the injection tip, would provide superior results. Such reverse taper designs appear to increase fuel economy, increase the life of the injectors, and address problems relating to fuel cavitations and emissions.

Due to the size and configuration of many workpieces, including fuel injection tips, fuel injection borings must be made from the outside of the workpiece. A certain amount of deviation from a constant bore diameter can be provided with a wire EDM by controlling spark voltage and other parameters. Due to edge effects, however, this technique tends to produce a barrel-shaped internal bore. A need exists for an EDM machine capable of producing precise reverse-taper or cone-shaped bores in articles such as fuel injection tips.

SUMMARY OF THE INVENTION

An EDM apparatus having a wire electrode and a wobble guide system for machining a bore in a workpiece is disclosed. The guide system comprises a guide body near the workpiece which stabilizes a first portion of an electrode, and a second portion of the electrode which extends from a guide nose at the end of the guide body. A working tip at the end of the second portion of the electrode interacts with the workpiece to erode and remove workpiece material at a desired location. As the electrode is fed through the guide body during the EDM machining process, the guide body is wobbled relative to the longitudinal axis of a desired workpiece bore such that the working tip of the electrode traces a continuous closed curve, such as a circle, across a plane perpendicular to the longitudinal axis. As the electrode advances into the workpiece, the second portion of the electrode sweeps out a bore having planar cross sections with substantially similar shape and progressively larger size. This apparatus permits reverse taper bores having funnel or cone shapes.

Other features and advantages of the invention will be apparent from the following detailed description and the accompanying drawings.

BRIEF DESCRIPTION OF THE DRAWINGS

The accompanying drawings incorporated in and forming a part of the specification illustrate several aspects of the present invention, and together with the description serve to explain the principals of the invention. In the drawings.

DETAILED DESCRIPTION OF THE INVENTION

The following description of the preferred embodiments is merely exemplary in nature and is in no way intended to limit the invention or its application or uses.

The present invention provides a detailed specification of an apparatus and a method for producing reverse-taper bores in a workpiece using an electrical discharge machine. In particular, an apparatus and method for wobbling a guide body positioned near a workpiece is disclosed, whereby as the guide body is wobbled about a longitudinal axis of a desired workpiece bore, a working tip of the electrode erodes material from the workpiece. As the guide body continues to wobble, the electrode tip is advanced into the workpiece bore where it traces out successively larger closed curves, resulting in a reverse taper bore.

Figure 1:
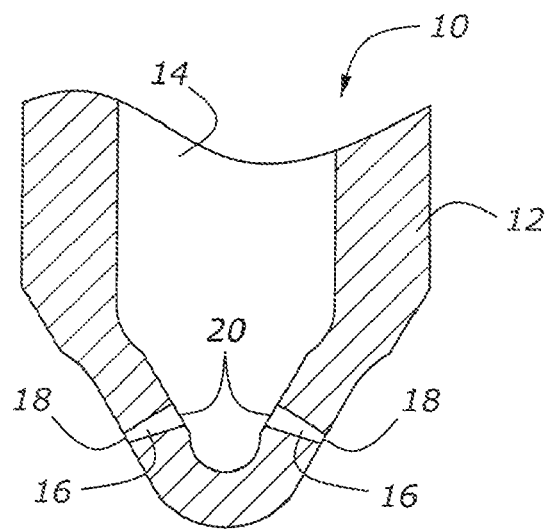
FIG. 1 is a simplified cross section of a fuel injection tip showing exaggerated reverse-taper cone-shaped bores.

FIG. 1 depicts a greatly enlarged cross section of a diesel fuel injection tip 10, showing injection tip wall 12 and injection tip inner cavity 14. Near the end of injection tip 10 are injector tip bores 16 having an outer orifice 18 and an inner orifice 20. In a diesel fuel engine, fuel is atomized as it leaves the injection tip under high pressure from inner cavity 14 through injection tip hole 16. Rather than have a cylindrical bore, it is thought that having a reverse-taper hole where inner orifice 20 is larger than outer orifice 18 may lead to improved fuel combustion and higher fuel efficiency.

Figure 2:
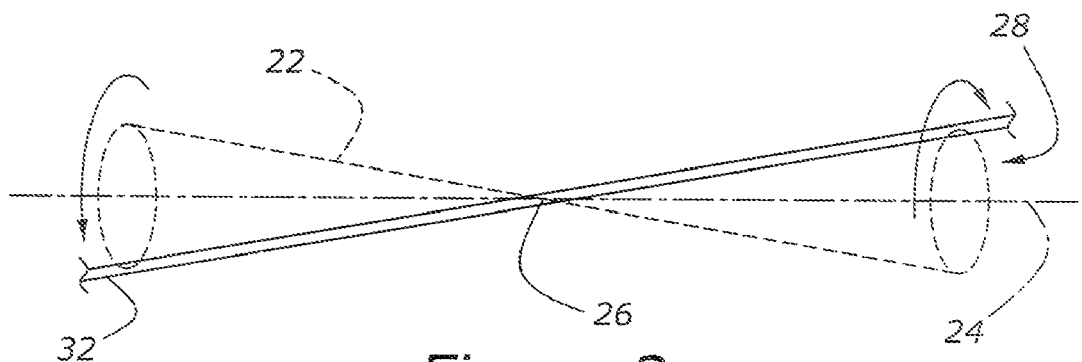
FIG. 2 illustrates a cone shape resulting from wobbling a line about a conical apex on a longitudinal axis.

One of the ways injection tip holes 16 may be bored is by using an electrical discharge machine (EDM) apparatus. Advancing an electrode tip along a axis into the workpiece would create a generally cylindrical bore. One way to create a non-cylindrical bore is to wobble the electrode as the hole is bored. FIG. 2 is an illustration of the wobble principle used in the invention. A line 22 intersects a longitudinal axis 24 at an apex point 26. While maintaining the intersection between line 22 and longitudinal axis 24 at apex point 26, the end of line 22 is moved (e.g. rotated) in a closed curve 28 about longitudinal axis 24. This produces a similarly shaped closed curve at the other end of line 22. FIG. 2 depicts closed curve 28 as a circle centered on longitudinal axis 24. In this depiction, line 22 thus sweeps out a right regular cone as it wobbles about apex point 26. Closed curve 28 could be any shape, including for example, an ellipse, a rectangle, or any combination of curves and lines.

Figure 3:
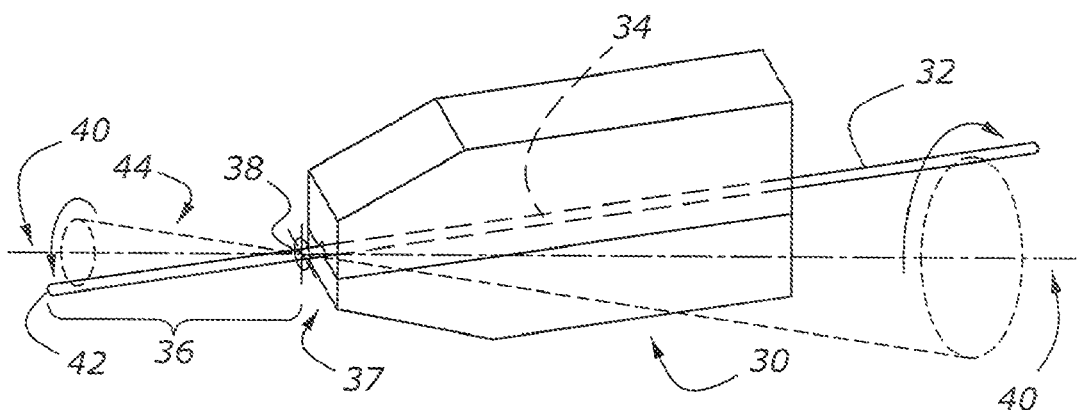
FIG. 3 depicts a simplified embodiment of a guide body stabilizing an electrode as it wobbles thereby creating a cone-shaped bore in a workpiece.

FIG. 3 depicts an electrode guide body 30 stabilizing an electrode 32. Guide body 30 is similar to that disclosed in U.S. Pat. No. 5,951,883. Electrode 32 has a first portion 34 within the guide body 30 and a second portion 36 extending from guide body nose 37. The second electrode portion 36 extends towards and into a workpiece (not shown). Guide body 30 is wobbled about an apex point 38 located on a longitudinal axis 40. In one embodiment, the workpiece would be positioned such that the exterior surface of the workpiece is located at or near apex point 38. If wobbled in a circular motion as described above, a working tip 42 at the terminal end of the second portion 36 of the electrode will trace a similar circle in the workpiece, and second electrode portion 36 will sweep out a cone shape 44. As electrode 32 advances through guide body 30 and into the workpiece, the circumference of the curve traced by working tip 42 will grow progressively larger. Electrode 32 may be advanced using a feeder means apparatus similar to that disclosed in U.S. Pat. No. 7,019,247. The bore thus produced in the workpiece created by working tip 42 of the electrode will have a reverse taper where the exterior orifice 18 is smaller than interior orifice 20 as shown in FIG. 1. In a typical reverse-taper injection tip 10, the thickness of wall 12, i.e., the depth of the tip hole 16, might be approximately 0.040 inches, the diameter of the electrode 0.005 inches, the diameter of outer orifice 18 0.006 inches, and the diameter of inner orifice 20 0.007 inches. Such measurements correspond to a conical taper of approximately 2 to 3 degrees measured from the bore's longitudinal axis 40.

Guide body 30 may be wobbled in any pattern. It need not even have an apex point 38, but could be wobbled in conjunction with non-longitudinal translation, thereby permitting compound bore shapes which have no fixed apex point.

Figure 4:
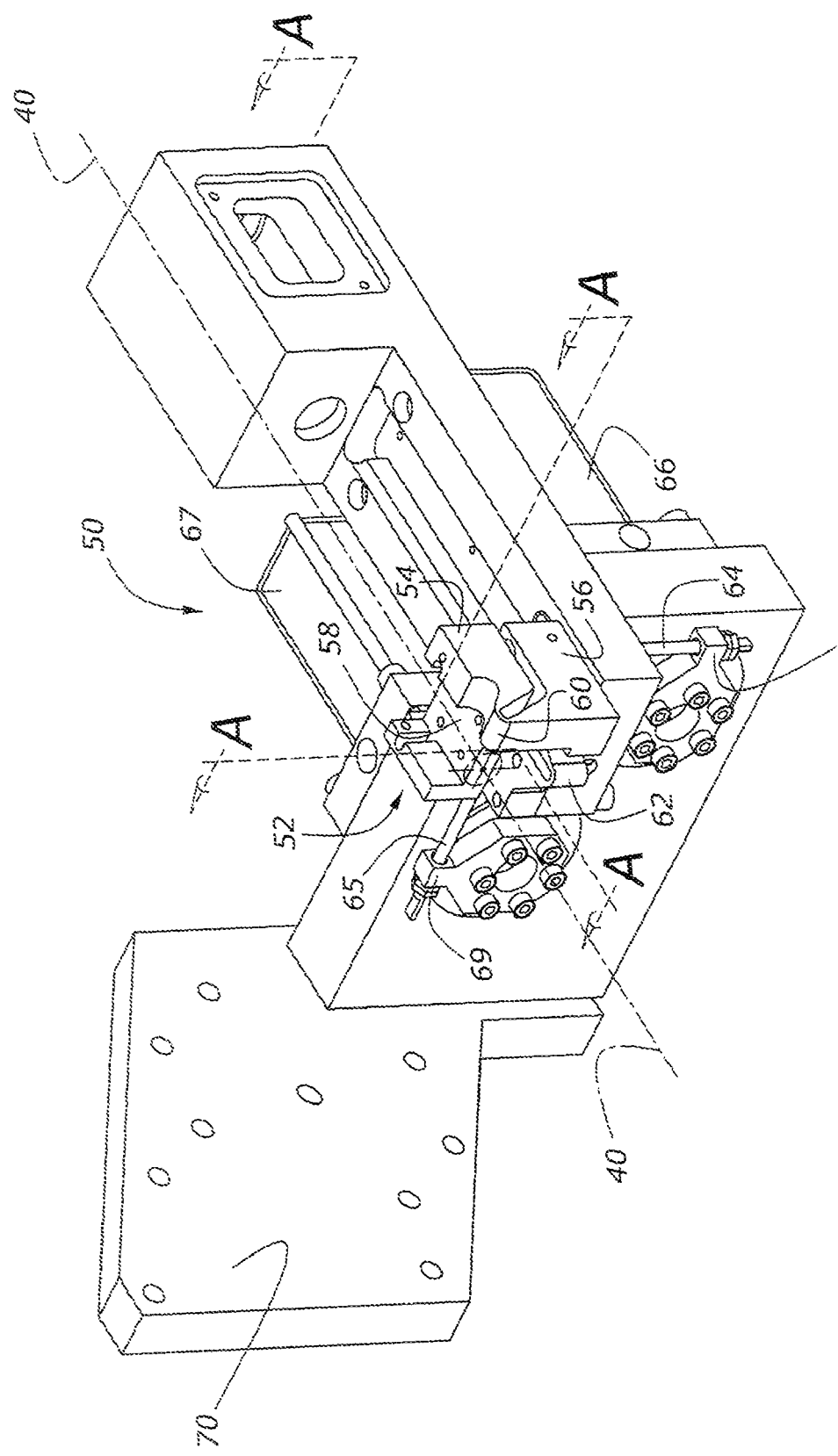
FIG. 4 is a perspective drawing of a portion of one embodiment of a wobble motion EDM machine having wobbling means comprised of orthogonally opposed live hinges perpendicular to a longitudinal axis of a workpiece bore.
Figure 5A:
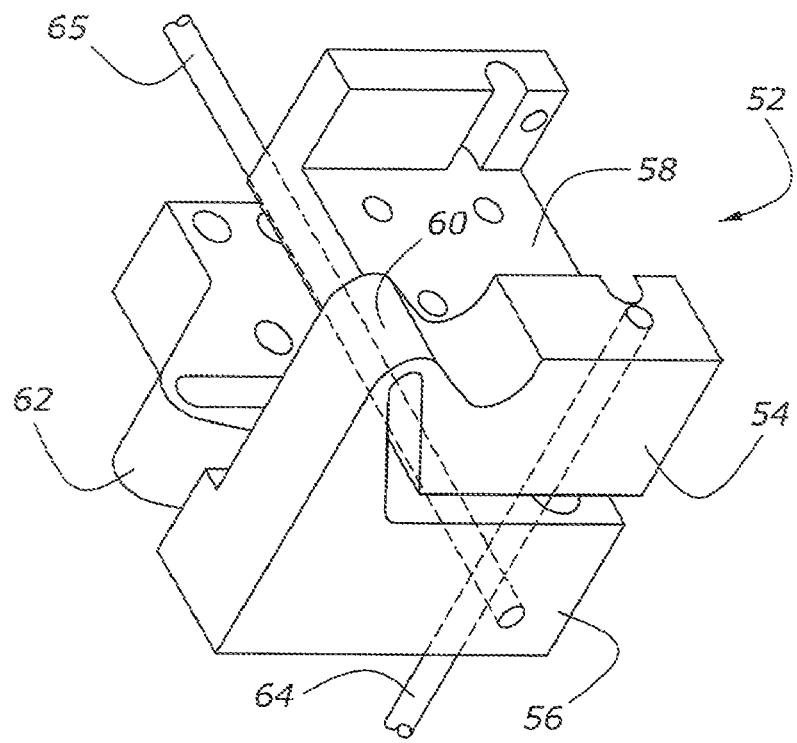
FIG. 5A and FIG. 5B are two perspective views of orthogonally hinged guide body block mount.
Figure 5B:
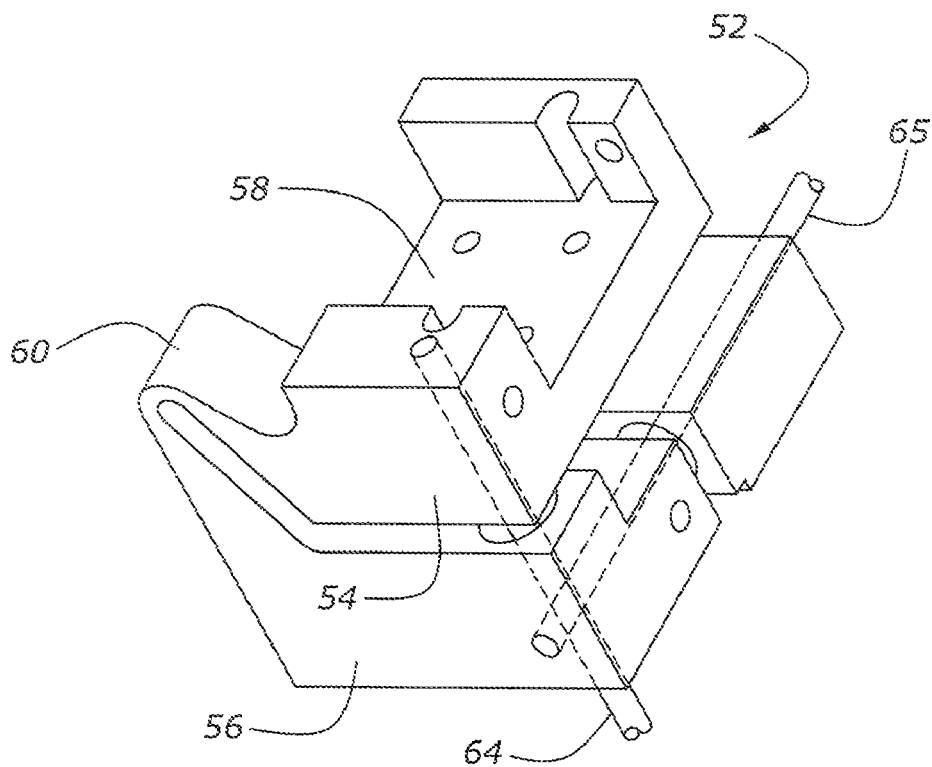
Figure 6:
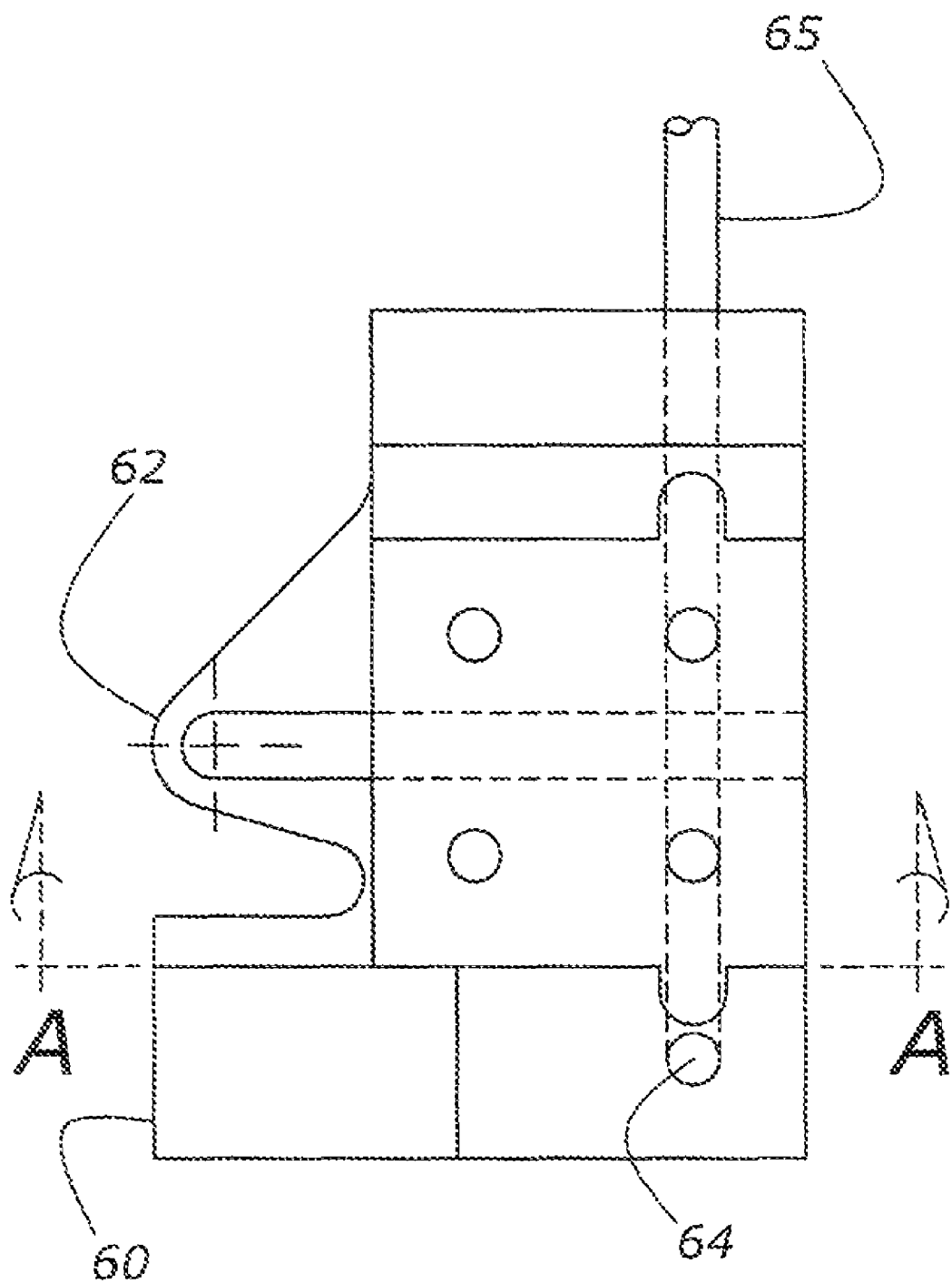
FIG. 6 is a top view of the orthogonally hinged guide body block mount.
Figure 7:
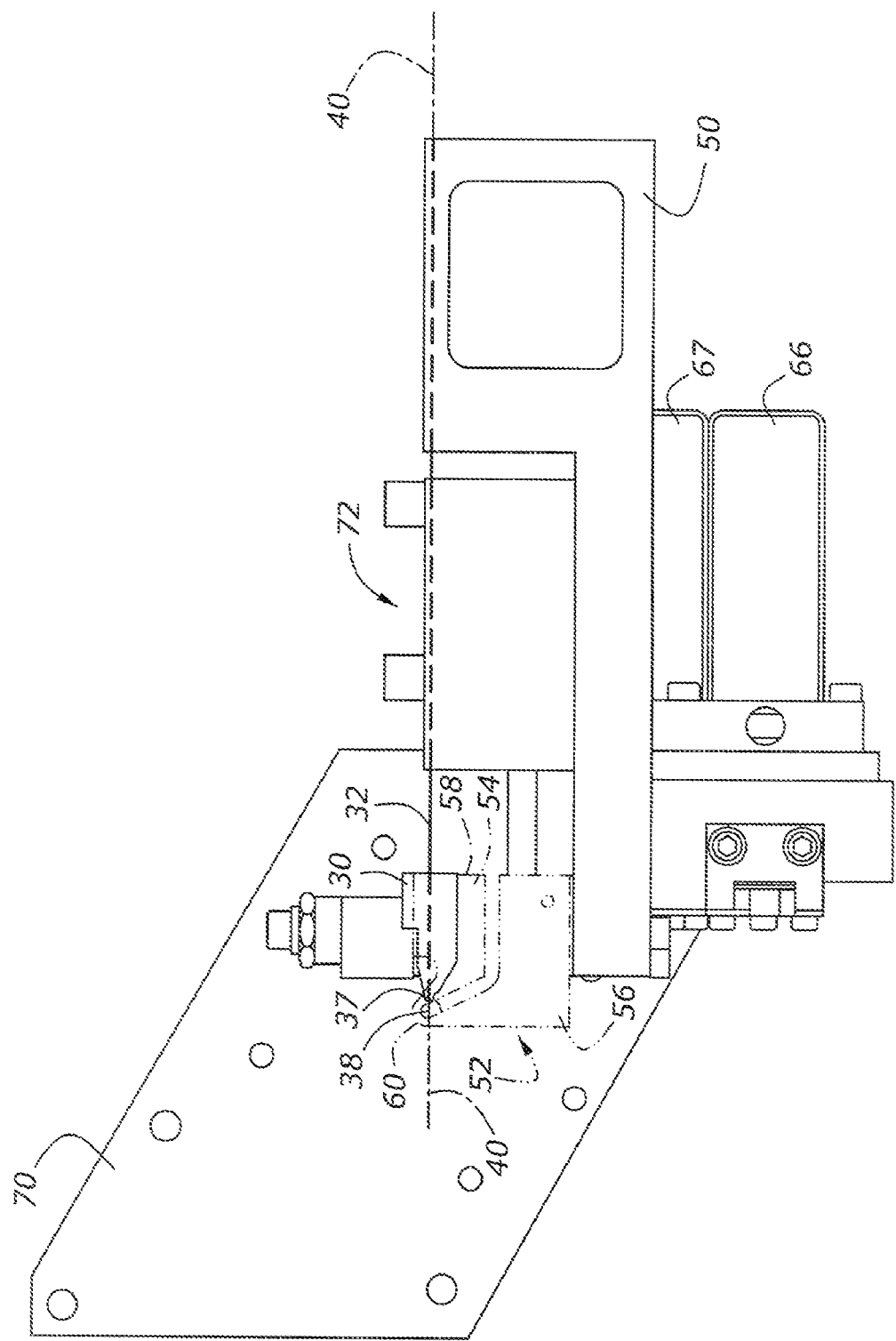
FIG. 7 is side view of a wobble motion EDM machine comprising a guide body attached to the orthogonally hinged guide body block mount.

Numerous means could be employed to wobble guide body 30. One embodiment is shown in FIGS. 4-7. FIG. 4 is a perspective view of an EDM reverse taper chassis 50. Attached to chassis 50 is guide body block mount 52 which supports guide body 30 (not shown in FIGS. 4-6). Guide body block mount 52 is comprised of a first guide support portion 54 and a second guide support portion 56. As best shown in FIG. 7, first guide support portion 54 has a guide body platform 58 to which a guide body 30 is secured. Guide body block mount 52 is fabricated from a solid block of rigid material, such as metal and has two live hinges which have axes which are both substantially perpendicular to the longitudinal axis 40 of a desired workpiece bore. First guide support portion 54 has a first hinge 60 with an axis substantially perpendicular to the longitudinal axis of the desired workpiece bore 40. Second guide support portion 56 has a second hinge 62 with an axis substantially perpendicular to the first hinge 60 axis and also substantially perpendicular to the longitudinal axis 40 of the desired workpiece bore. If appropriate moment force is applied to first guide support portion 54, guide body platform 58 will flex and partially rotate about the axis of first hinge 60. If appropriate moment force is applied to second guide support portion 56, guide body platform 58 will flex and partially rotate about the axis of second hinge 62.

In one embodiment, the aforementioned moment force is applied to the guide support by means of two control rods 64 and 65 independently attached to first guide support portion 54 and second guide support portion 56 respectively. Force is applied to the control rods by means of two servo motors 66 and 67, each having respective torque arms 68 and 69 attached to servo motors 66 and 67 and to respective control rods 64 and 65. Referring to FIG. 4, FIG. 5A, FIG. 5B, and FIG. 6, when servo motor 66 is actuated, torque arm 68 applies force to control rod 64. Control rod 64 extends freely through a clearance bore in second guide support portion 56 and is secured to first guide support portion 54. When torque is applied to torque arm 68, control rod 64 transmits that force as a bending moment to first guide support portion 54, causing guide body platform 58 to bend about an axis defined by first hinge 60. Torque arm 68 and servo motor 66 are designed so that movement of control rod 64 can be precisely controlled in either direction. Similarly, servo motor 67 in FIG. 4 is connected to torque arm 69 which in turn is connected to control rod 65. As best shown in FIG. 5B and in FIG. 6, control rod 65 extends freely through a clearance bore in a part of second guide support portion 56, across a vacant hinge space, then through to the far side of second guide support portion 56 where it is secured. When servo motor 67 is actuated, torque arm 69 pushes or pulls control rod 65 to flex the second guide support portion 56 about an axis defined by second hinge 62. As can be seen from FIGS. 4-6, when second guide support portion 56 flexes about an axis defined by second hinge 62, first guide support portion 54 as well as guide body platform 58 also both flex about the axis defined by second hinge 62.

The axis defined by first hinge 60 and the axis defined by second hinge 62 are perpendicular and preferably intersect at a defined point on the longitudinal axis of the desired workpiece bore 40, which point constitutes apex 38 of, e.g., a cone-shaped bore. As first guide support portion 54 and second guide support portion 56 are flexed, guide body platform 58 wobbles about apex 38. By precisely coordinating the distance traveled by control rods 64 and 65 and the flexing of guide body mount 52, guide body platform 58 can be wobbled in a desired pattern, for example, an elliptical pattern substantially centered about longitudinal axis 40. The term "ellipse" in this specification and the claims includes not only the common understanding of that term but also the special case where an ellipse is a circle.

FIG. 7 shows the basic structure of an EDM machine incorporating the wobble mechanism described above. Guide body block mount 52 is attached to EDM chassis 50. FIG. 7 depicts the EDM machine in profile except for guide body block mount 52 which is cut away in cross section at A-A as indicated in FIG. 6 to reveal guide body 30 attached to first guide support portion 54, and more specifically attached to guide body platform 58. The longitudinal axis of a desired workpiece bore 40 extends the length of the EDM machine. Electrode 32 extends substantially along the longitudinal axis of a desired workpiece bore 40, through guide body 30, and extends from the tip of guide body nose 37. As guide body platform 58 is wobbled as described above, guide body 30 is wobbled about longitudinal axis 40. In a one embodiment, the wobbling motion is circular creating a reverse taper cone shape bore in the workpiece. In another embodiment, the wobbling motion is elliptical creating a reverse taper "flattened" cone shape bore.

Apex point 38 is defined by the intersection of the axis defined by the first hinge 60, the axis defined by second hinge 62, and the longitudinal axis of the desired workpiece bore 40. In operation, a workpiece would be attached to workpiece bracket 70 such that the outer orifice 18 of a desired workpiece bore 16 is at or near apex point 38. In the claims and this specification, an apex point described as being between the terminal end of guide body nose 37 and the external surface of workpiece 10 includes an apex point that is substantially coplanar with outer orifice 18.

As the EDM process commences, guide body 30 begins wobbling in a pattern, such as an elliptical pattern, or an ellipse that is a circle. As the working tip of the electrode 42 comes into proximity with the workpiece, it erodes the material to create outer orifice 18. Feeder mechanism 72 precisely feeds electrode 32 into guide body 30, which stabilizes a first portion of the electrode 34. As the second portion 36 of the electrode extends outward from guide body nose 37, the wobbling motion of guide body 30 causes it to sweep out a reverse taper elliptical cone shape according to the wobble pattern of guide body 30. As electrode 32 is progressively advanced deeper into the workpiece, the size of the closed curve generated by the movement of the working tip of the electrode 42 becomes progressively larger, thereby creating a reverse taper bore in the workpiece.

Figure 8:
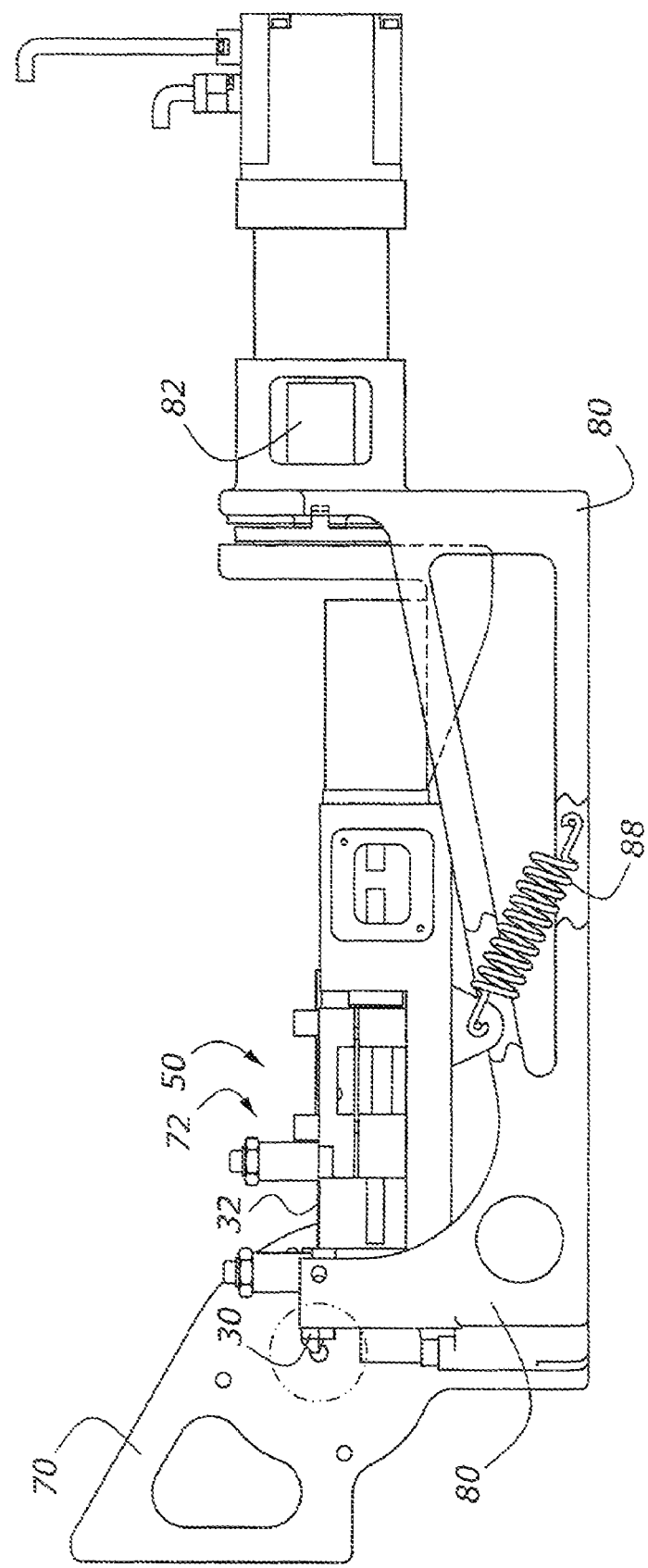
FIG. 8 is a side view of another embodiment of a wobble motion EDM machine where the guide body and feeder apparatus are wobbled by an eccentric.
Figure 9:
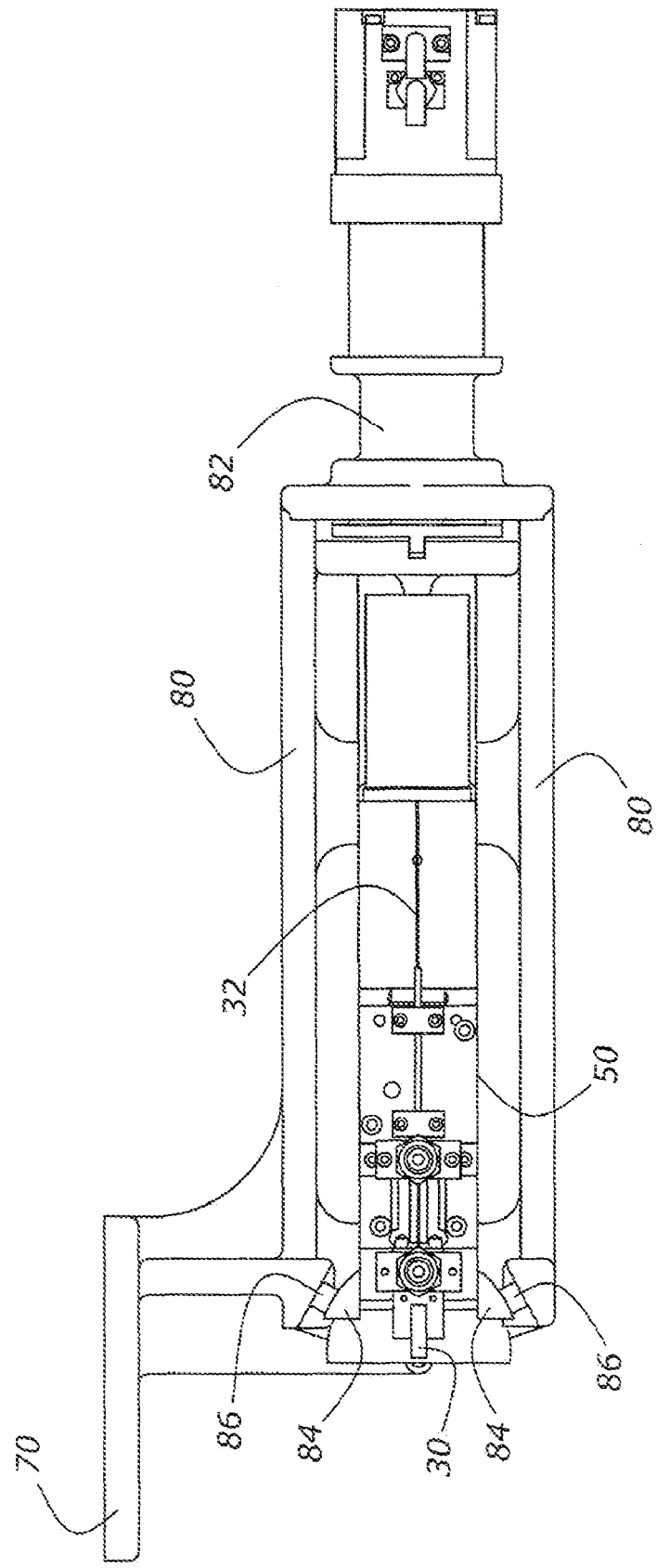
FIG. 9 is a top view of an eccentric-driven wobble motion EDM apparatus.

There are many other means of wobbling guide body 30 relative to the workpiece. FIG. 8 shows an EDM machine having an EDM chassis 50 within a frame 80. Feeder mechanism 72 advances electrode 32 into guide body 30. In this embodiment of the invention, rather than wobbling only guide body 30, the entire EDM chassis 50, including feeder mechanism 72 and guide body 30, is wobbled. The means for wobbling chassis 50 in FIG. 8 could be an eccentric within eccentric housing 82 causing EDM chassis 50 to wobble relative to frame 80. As shown in a top view of this embodiment in FIG. 9, EDM chassis 50 has at least two support braces 84 which rest against support shoulders 86 attached to frame 80 in at least two places. Referring to FIG. 8, biasing means, such as a spring 88, is attached to EDM chassis 50 and frame 80 applying rearward force to EDM chassis 50 to promote firm contact between the support braces 84 and the support shoulders 86.

The design of the wobble mechanism within eccentric housing 82 could take many forms. A rotor could rotate about longitudinal axis 40 fixed to frame 80, with EDM chassis 50 being linkably attached to an eccentric on the rotor, thereby causing EDM chassis 50 to wobble about longitudinal axis 40 as the rotor rotated. Optionally, a variety of couplings, offset axles, or cams could be attached to frame 80 and connected to EDM chassis 50 to generate the wobbling motion described above.

As a person skilled in the art will readily appreciate, the above description is meant as an illustration of implementation of the principals of this invention. This description is not intended to limit the scope or application of this invention in that the invention is susceptible to modification, variation and change, without departing from the spirit of this invention, as defined in the following claims.

I claim:

1. An electrical discharge machining apparatus for a wire electrode and having a guide system for the wire electrode for machining bores in a workpiece, the guide system comprising:
    a guide body for positioning near the workpiece for stabilizing a first portion of the electrode, defining a guide nose at the end of the guide body closest to the workpiece from which a second portion of the electrode extends;
    the electrode forming a working tip at the end of the second portion of the electrode in communication with the workpiece;
    feeder means for advancing the electrode within the guide body during the machining; and
    wobbling means for moving the guide body relative to the longitudinal axis of a desired workpiece bore during the machining such that the working tip of the electrode traces a continuous closed curve across a plane perpendicular to the longitudinal axis, and such that as the electrode advances into the workpiece as the electrode sweeps out a bore having planar cross sections with a shape substantially similar to the closed curve shape,
    where the wobbling means comprises:
    a machine frame;
    a first guide support portion to which the guide body is secured having a first hinge axis substantially perpendicular to the longitudinal axis of the desired workpiece bore;
    a second guide support portion attached to the first guide support portion and attached to the machine frame, having a second hinge axis which is substantially perpendicular to the first hinge axis and substantially perpendicular to the longitudinal axis of the desired workpiece bore;
    hinging means for partially rotating the first guide support portion about the first hinge axis and for partially rotating the second guide support portion about the second hinge axis.
    a first guide support portion to which the guide body is secured having a first hinge axis substantially perpendicular to the longitudinal axis of the desired workpiece bore;

2. The apparatus of claim 1 where the working tip of the electrode traces a continuous closed curve across at least one planar cross section of the bore which is larger than the planar cross section of the bore at the external surface of the workpiece.

3. The apparatus of claim 2 where every successive planar cross section along the longitudinal axis of the bore from the external surface of the workpiece to the end of the bore is at least as large as the planar cross section preceding it.

4. The apparatus of claim 3 where the continuous closed curve is an ellipse.

5. The apparatus of claim 3 wherein the closed curve is a circle.

6. The apparatus of claim 2 where the second portion of the electrode sweeps out a cone shape having a conical apex between the terminal end of the guide nose and the external surface of the workpiece.

7. The apparatus of claim 6 where the ellipse is a circle and the cone-shape is a right regular cone.

8. The apparatus of claim 1 where the hinging means comprises:
    first bending means for partially rotating the first guide support portion about the first hinge axis; and
    second bending means for partially rotating the second guide support portion about the second hinge axis.

9. The apparatus of claim 8 further comprising:
    a first force means for applying a force attached to the machine frame;
    a second force means for applying a force attached to the machine frame;

a first connecting means for connecting the first force means to the first guide support portion adapted to partially rotate the first guide support portion about the first hinge axis; and a second connecting means for connecting the second force means to the second guide support portion adapted to partially rotate the second guide support portion about the second hinge axis.

10. An electrical discharge machining apparatus for a wire electrode and having a guide system for the wire electrode for machining bores in a workpiece, the guide system comprising:

a guide body for positioning near the workpiece for stabilizing a first portion of the electrode, defining a guide nose at the end of the guide body closest to the workpiece from which a second portion of the electrode extends;

the electrode forming a working tip at the end of the second portion of the electrode in communication with the workpiece;

feeder means for advancing the electrode within the guide body during the machining; and wobbling means for moving the guide body relative to the longitudinal axis of a desired workpiece bore during the machining such that the working tip of the electrode traces a continuous closed curve across a plane perpendicular to the longitudinal axis, and such that as the electrode advances into the workpiece as the electrode sweeps out a bore having planar cross sections with a shape substantially similar to the closed curve shape, where the wobbling means comprises:

an electrode feeder assembly incorporating the feeder means and rigidly attached to the guide body;

a machine frame flexibly supporting the electrode feeder assembly; and a mechanism linking the electrode feeder assembly to an eccentric rotating about an axis fixed to the machine frame and wobbling the electrode feeder assembly about two hinge axes perpendicular to the longitudinal axis.

11. The apparatus of claim 10 further comprising:

at least two support braces attached near the end of the electrode feeder assembly nearest the workpiece;

a support shoulder attached to the machine frame and adapted to receive the at least two support braces; and biasing means attached to the electrode feeder assembly and to the machine frame to promote firm contact between the support collar and the support shoulder.

12. An electrical discharge machining apparatus having a wire electrode and a guide system for machining bores in a workpiece, the guide system comprising:

a guide body for positioning near the workpiece stabilizing a first portion of the electrode, defining a guide nose at the end of the guide body closest to the workpiece from which a second portion of the electrode extends;

a working tip at the end of the second portion of the electrode in communication with the workpiece;

an electrode feeder assembly rigidly attached to the guide body adapted to advance the electrode towards the workpiece during the machining;

a machine frame supporting the electrode feeder assembly;

at least two support braces attached to the electrode feeder assembly end which is nearest the workpiece;

a support shoulder attached to the machine frame and adapted to receive the at least two support braces;

biasing means attached to the electrode feeder assembly and to the machine frame to promote firm contact between the support braces and the support shoulder; and a mechanism linking the electrode feeder assembly to an eccentric rotating about an axis fixed to the machine frame, whereby the guide body is wobbled relative to the longitudinal axis of a desired workpiece bore during the machining such that as the electrode advances along the longitudinal axis of the bore from the external surface of the workpiece to the end of the bore, the working tip of the electrode traces successively larger ellipses across planes perpendicular to the longitudinal axis, thereby creating a reverse taper cone-shape bore having a conical apex between the terminal end of the guide nose and the external surface of the workpiece.

13. The apparatus of claim 12 where the ellipses are circles and the cone shape is a right regular cone.

14. An electrical discharge machining apparatus having a wire electrode and a guide system for machining bores in a workpiece, the guide system comprising:

a guide body for positioning near the workpiece stabilizing a first portion of the electrode, defining a guide nose at the end of the guide body closest to the workpiece and a terminal end of the guide nose from which a second portion of the electrode extends;

a working tip at the end of the second portion of the electrode in communication with the workpiece;

a machine frame;

a first guide support portion to which the guide body is secured having a first hinge axis substantially perpendicular to the longitudinal axis of a desired workpiece bore;

a second guide support portion attached to the first guide support portion and attached to the machine frame, having a second hinge axis which is substantially perpendicular to the first hinge axis and to the longitudinal axis of the desired workpiece bore;

a first force means for applying a force attached to the machine frame;

a second force means for applying a force attached to the machine frame;

a first connecting means for connecting the first force means to the first guide support portion to partially rotate the first guide support portion about the first hinge axis; and a second connecting means for connecting the second force means to the second guide support portion to partially rotate the second guide support portion about the second hinge axis, whereby the guide body is wobbled during the machining by coordinated bending actions of the first force means and the second force means upon the guide support such that as the electrode advances along the longitudinal axis from the external surface of the workpiece to the end of the bore, the working tip of the electrode traces successively larger ellipses across planes perpendicular to the longitudinal axis, thereby creating a reverse taper cone-shape bore having a conical apex between the terminal end of the guide nose and the external surface of the workpiece.

15. The apparatus of claim 14 where the ellipses are circles and the cone shape is a right regular cone.

16. A method of boring reverse taper bores in a workpiece using an electrical discharge machining apparatus having a wire electrode comprising the steps of:

stabilizing a first portion of the electrode within a guide body;

extending a second portion of the electrode from the guide body towards the workpiece such that at least one point on the electrode intersects the longitudinal axis of a desired workpiece bore;

wobbling the guide body relative to the longitudinal axis such that a working tip at the end of the second portion of the electrode traces an ellipse across a plane perpendicular to the longitudinal axis of the bore;

advancing the electrode so that as it machines the bore from the external surface of the workpiece to the end of the bore, the second portion of the electrode creates the bore with a cone-shape with a reverse taper having a conical apex between the terminal end of the guide nose and the external surface of the workpiece, where the step of wobbling comprises the steps of:

attaching the guide body to a first guide support portion having a first hinge axis substantially perpendicular to the longitudinal axis;

attaching a second guide support portion to a machine frame and to the first guide support portion, the second guide support portion having a second hinge axis which is substantially perpendicular to the first hinge axis and substantially perpendicular to the longitudinal axis;

applying orthogonally opposed forces upon the guide support such that a first force means attached to the machine frame exerts force upon a first connection to the first guide support portion and a second force means attached to the machine frame exerts a force upon a second connection to the second guide support portion; and coordinating the first and second force means such that the first guide support portion partially rotates about the first hinge axis and the second guide support portion partially rotates about the second hinge axis to achieve the desired wobble pattern in the guide body.

17. The method of claim 16 where the ellipse is a circle and the cone shape is a right regular cone.

18. The method of claim 16 where the ellipse is a circle and the cone shape is a right regular cone.

19. A method of boring reverse taper bores in a workpiece using an electrical machining apparatus having a wire electrode comprising the steps of:

stabilizing a first portion of the electrode within a guide body;

extending a second portion of the electrode from the guide body towards the workpiece such that at least on the electrode intersects the longitudinal axis of a desired workpiece bore;

wobbling the guide body relative to the longitudinal axis such that a working tip at the end of the second portion of the electrode traces an ellipse across a plane perpendicular to the longitudinal axis of the bore;

advancing the electrode so that as it machines the bore from the external surface of the workpiece to the end of the bore, the second portion of the electrode creates the bore with a cone-shape with a reverse taper having a conical apex between the terminal end of the guide nose and the external surface of the workpiece, where the step of wobbling comprises the steps of:

rigidly attaching the electrode guide body to an electrode feeder assembly which is moveably supported within a machine frame; and linking the electrode feeder assembly to an eccentric rotating about an axis fixed to the machine frame and wobbling the electrode feeder assembly about two hinge axes perpendicular to the longitudinal axis.

* * * * *

UNITED STATES PATENT AND TRADEMARK OFFICE
CERTIFICATE OF CORRECTION

| | | |
|---|---|---|
| PATENT NO. | : 7,964,817 B2 | Page 1 of 1 |
| APPLICATION NO. | : 11/750011 | |
| DATED | : June 21, 2011 | |
| INVENTOR(S) | : John MacGregor | |

It is certified that error appears in the above-identified patent and that said Letters Patent is hereby corrected as shown below:

In the Claims

In Column 10, claim 19, line 6, after "electrical" insert --discharge-- and in line 11, after "least" insert --one point--.

Signed and Sealed this
Sixth Day of September, 2011

David J. Kappos
*Director of the United States Patent and Trademark Office*